United States Patent [19]
Rowe

[11] Patent Number: 5,874,959
[45] Date of Patent: Feb. 23, 1999

[54] TRANSPARENT OVERLAY VIEWER INTERFACE

[76] Inventor: A. Allen Rowe, 6475 Mesedge Dr., Colorado Springs, Colo. 80919-1812

[21] Appl. No.: 880,483

[22] Filed: Jun. 23, 1997

[51] Int. Cl.⁶ ........................................ G06F 3/14
[52] U.S. Cl. .................. 345/339; 345/348; 345/145
[58] Field of Search ................. 345/339, 348, 345/352, 353, 354

[56] References Cited

U.S. PATENT DOCUMENTS

| | | | |
|---|---|---|---|
| 5,010,323 | 4/1991 | Hoffman | 340/706 |
| 5,195,130 | 3/1993 | Weiss et al. | 379/98 |
| 5,250,929 | 10/1993 | Hoffman et al. | 345/146 |
| 5,283,560 | 2/1994 | Bartlett | 345/113 |
| 5,307,457 | 4/1994 | Beitel et al. | 345/348 |
| 5,430,839 | 7/1995 | Jagannathan et al. | 395/159 |
| 5,473,745 | 12/1995 | Berry et al. | 395/157 |
| 5,586,242 | 12/1996 | McQueen, III et al. | 395/167 |
| 5,617,114 | 4/1997 | Bler et al. | 345/113 |
| 5,619,639 | 4/1997 | Mast | 395/326 |
| 5,621,428 | 4/1997 | King et al. | 345/118 |
| 5,737,553 | 4/1998 | Bartok | 345/339 |
| 5,805,165 | 9/1998 | Thorne, III et al. | 345/348 |

*Primary Examiner*—Raymond J. Bayerl
*Assistant Examiner*—Chadwick A. Jackson
*Attorney, Agent, or Firm*—Holme Roberts & Owen LLP

[57] ABSTRACT

The transparent overlay viewer interface system of the present invention provides control areas that minimize or eliminate viewer distraction. In one implementation a grid of nine transparent control areas are overlayed on a foreign language instructional program that includes video of conversational situations. Each of the control areas is assigned a control function such as replaying an utterance chunk, providing foreign language subtitles, providing a translated text, etc. The video may be displayed on a projection screen or large monitor in the classroom environment and operated by an instructor using an infrared mouse or other remote control device or a conventional mouse. The resulting transparent interface promotes viewer immersion in the video program and greater overall program effectiveness.

23 Claims, 10 Drawing Sheets

|   |   |   |
|---|---|---|
| 6 | 1 | 5 |
| 2 | 0 | 4 |
| 7 | 3 | 8 |

FIG. 4

TRANSPARENT OVERLAY VIEWER INTERFACE

FIELD OF THE INVENTION

The present invention relates generally to computer user interfaces and, in particular, to a graphical user interface (GUI) system with interface control areas that minimize interference with or distraction from the underlying application. The invention is particularly advantageous for use in connection with immersive computer applications such as interactive language skills, graphical design and virtual reality programs where it is important for the user to remain fully engaged in the graphical or audiovisual program presentation.

BACKGROUND OF THE INVENTION

A common feature of computer systems used in the home and office environment is an interface by which the user can interact with the computer system. Such interfaces generally involve a control area that the user selects or activates, e.g., via key strokes or mouse inputs, to implement a function associated with the control area. Conventional user interfaces can generally be categorized as being either graphical or key based, depending on where the control area is located or implemented.

In key based systems, the control area is located or implemented on a keyboard, control pad or other input device separate from the computer screen or display. In these systems the user often must contend with complicated physical manipulation of keys or buttons on the keyboard or control pad in order to select a desired function. Such manipulation of the keyboard or control pad draws the user's attention away from the display and, therefore, can interfere with the user's involvement in the active application.

In recent years, GUI operating systems have gained favor. User interaction in GUI operating systems generally involves placing control areas, such as menus, tool bars, dialogue boxes, or icons on a screen or other display. One advantage of such GUI operating systems is that the user or viewer can interact with the operating system and application programs without diverting attention from the display. GUI operating systems thus promote user immersion in the underlying application. However, when control areas are placed on the display, they occupy part of the user's viewing space and so obstruct or distract from the user's capacity to see and focus on the underlying visual presentation.

More recently, some developers have proposed translucent or superimposed control areas that only partially occlude the visual presentation. For example, the control areas of such systems may appear as a lightly shaded image through which the viewer can see the visual presentation. With a translucent or superimposed control area, however, the viewer may still be distracted by the image of the control area and not able to focus completely on the visual presentation.

SUMMARY OF THE INVENTION

The present invention provides a transparent user interface control area(s) in the computer display, e.g., on a monitor, projected image or other graphical working area. That is, such a control area occupies or corresponds to certain coordinates or a certain region of the display but is substantially visually imperceptible to the viewer. The control area thus operates as an essentially invisible overlay such that the viewer has an unobstructed view of the visual presentation. In addition, because the control area is presented in the display area, and not on a separate keyboard or control pad, the viewer is not distracted by substantial physical manipulation and attendant diversion of focus area that may be required to interact with the keyboard or control pad.

The process of the present invention involves displaying visual material (e.g., the visual presentation of an application program) within at least a first portion of the viewing space. That is, the visual material may occupy the entire computer display or a portion of the display such as a window. A transparent control area overlays or is located on at least part of this first portion of the viewing space. Associated with the transparent control area is a user interaction function, by which the user can choose and convey decisions about the user's interaction with the computer system. For example, in the case of an interactive language skills program, the interaction function associated with the transparent control area may be one of: rewinding the program, providing translated or transliterated text, forwarding the program, etc. The user communicates choices through a user selection input that is linked with the transparent control area. The selection input can be implemented, for example, by way of a mouse, finger, stylus or other user input directed to the known coordinates or location of the transparent control area.

It will be appreciated that the location of the transparent control area is understood by the user to correspond to a display area despite the absence of any significant visual manifestation of the control area across the corresponding display area. In this regard, the location of the control area may be committed to memory by the user. Minimal visual cues, such as marginal hash marks, may be provided according to the present invention as aids to memory or to help identify control area boundaries without significantly intruding on the visual material of the underlying program.

The user's interaction with the computer system through the transparent control area may include one or more options. The control area may occupy all or a part of the viewing space, and it may be divided into control regions, each of which offers a different interaction option for the user. Given the visual and mental capacity of most users to divide two-dimensional space into right to left regions, and top to bottom regions, the invention preferably involves providing a transparent control area divided into a transparent grid of multiple regions, offering many choices for interaction to the user. Further, users may be provided instructional materials (e.g., displayed on a monitor or in hard copy) that identify the choices associated with specific regions, or users may be given the option of choosing and assigning options to one or more regions.

The present invention thus provides a user interface system that is graphically oriented without significantly interfering with or distracting from the visual presentation of the underlying application program. In this manner, user and viewer attention can remain focused on the visual presentation and immersion into the underlying program is promoted.

BRIEF DESCRIPTION OF THE DRAWINGS

For a more complete understanding of the present invention and further advantages thereof, reference is now made to the following Detailed Description taken in conjunction with the drawings, in which:

FIG. 4 shows a graphical arrangement for a nine control area implementation of the present invention.

DETAILED DESCRIPTION OF THE PREFERRED EMBODIMENT

Figure 1:
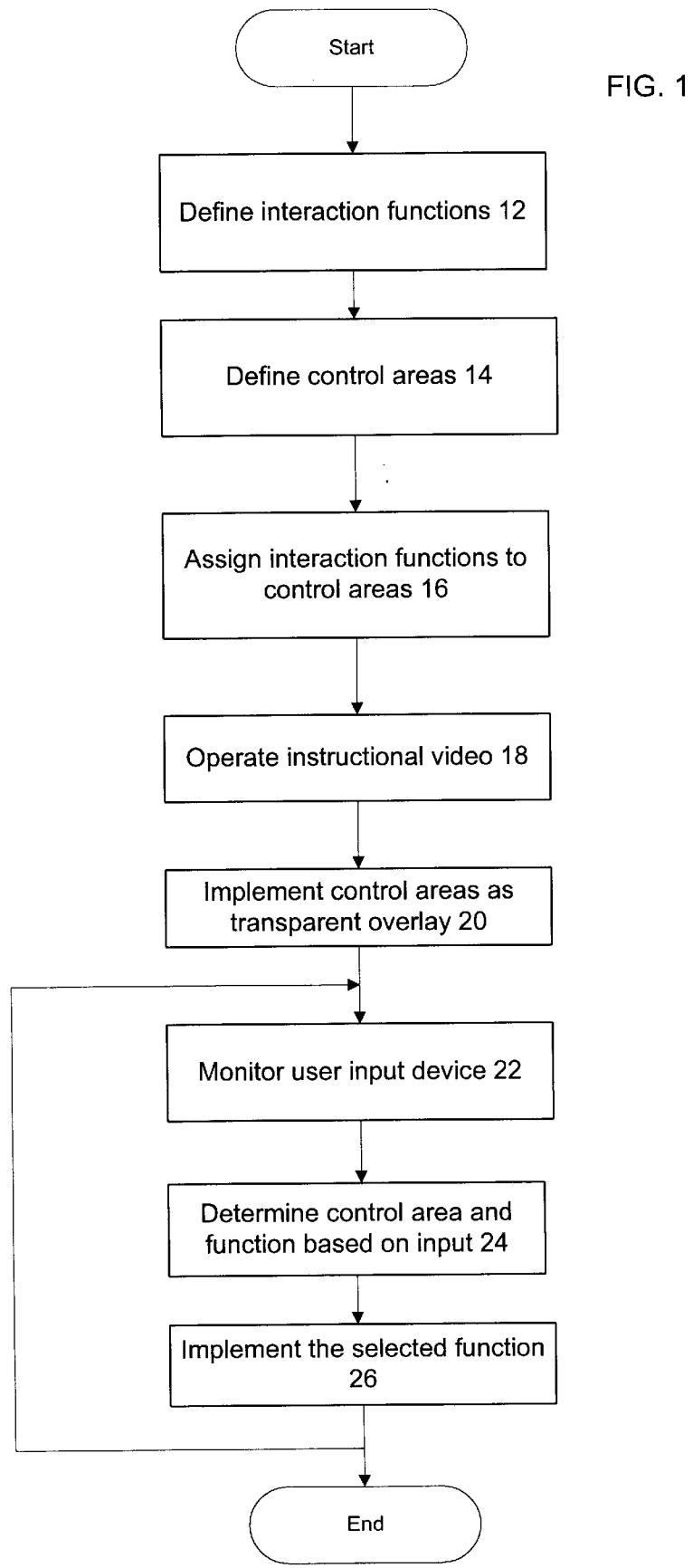
FIG. 1 is a flow chart illustrating operation of the control program of the present invention.
Figure 2A:
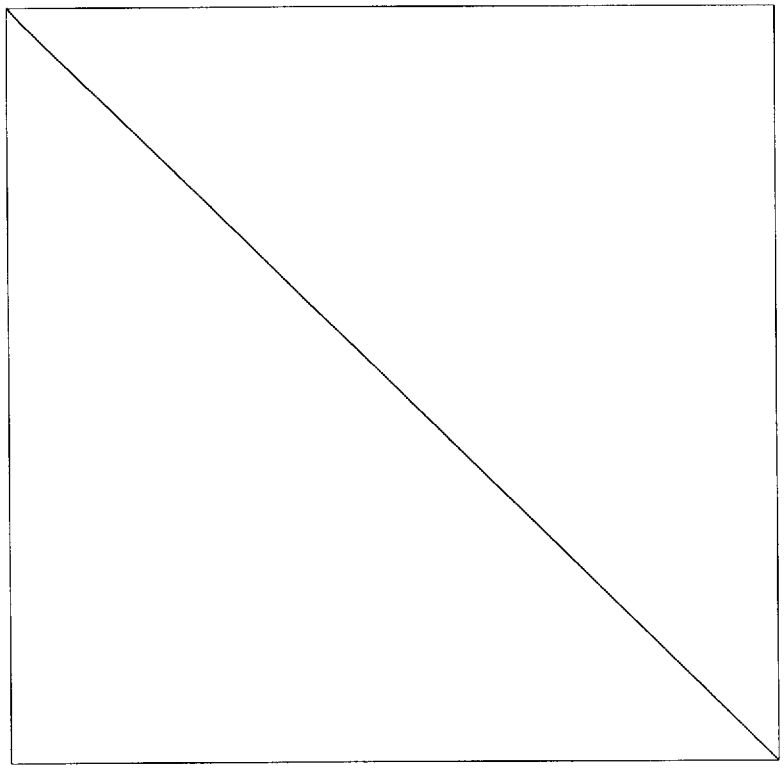
FIGS. 2A through 2F show various graphical arrangements for a two control area implementation of the present invention.
Figure 2B:
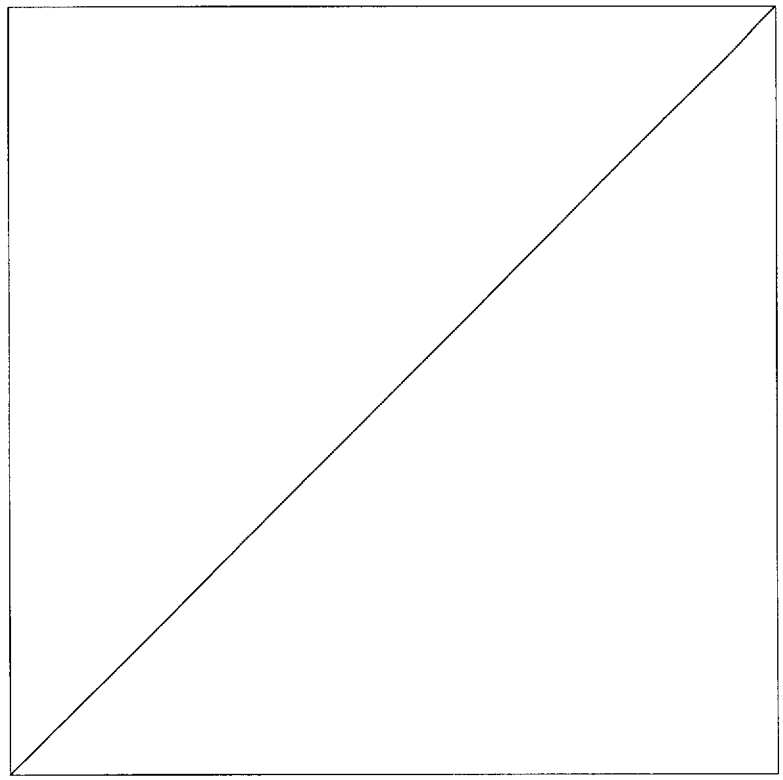
Figure 2C:
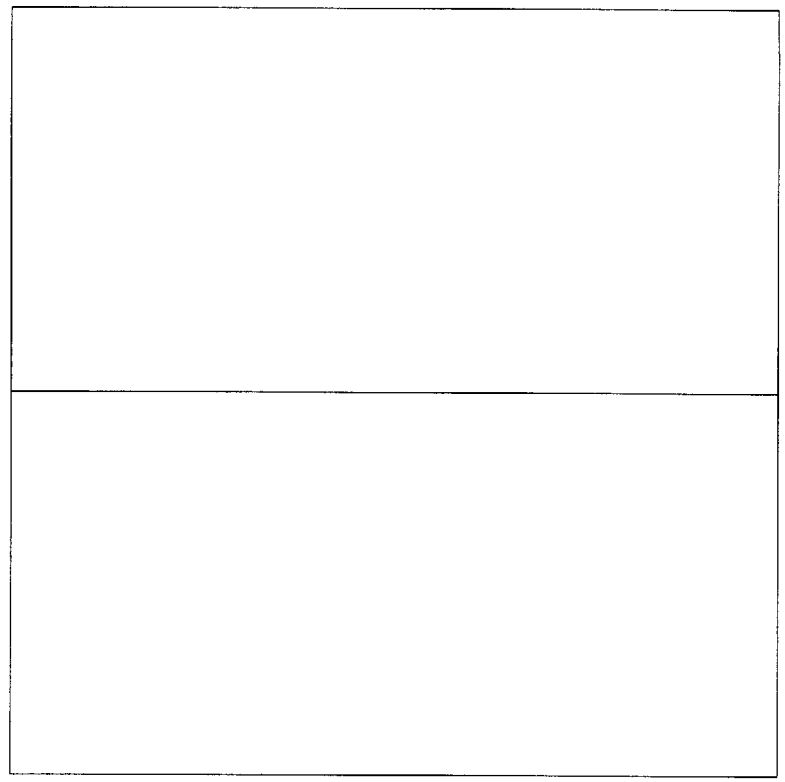
Figure 2D:
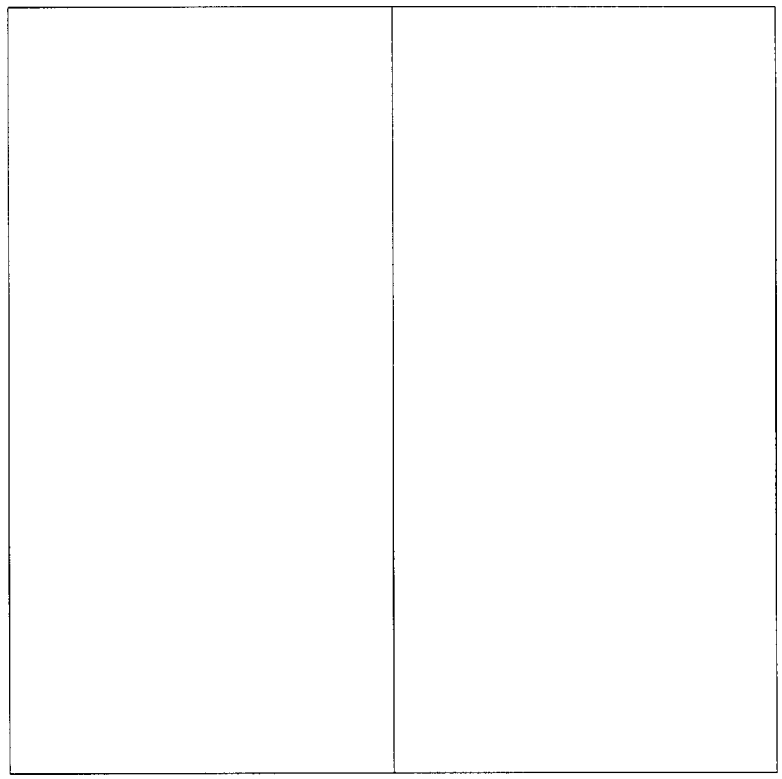
Figure 2E:
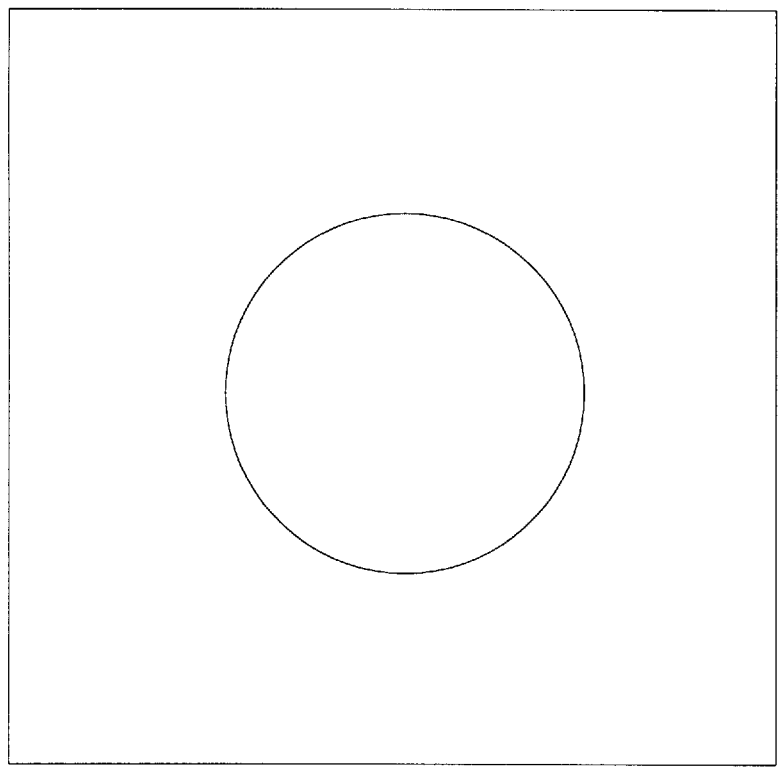
Figure 2F:
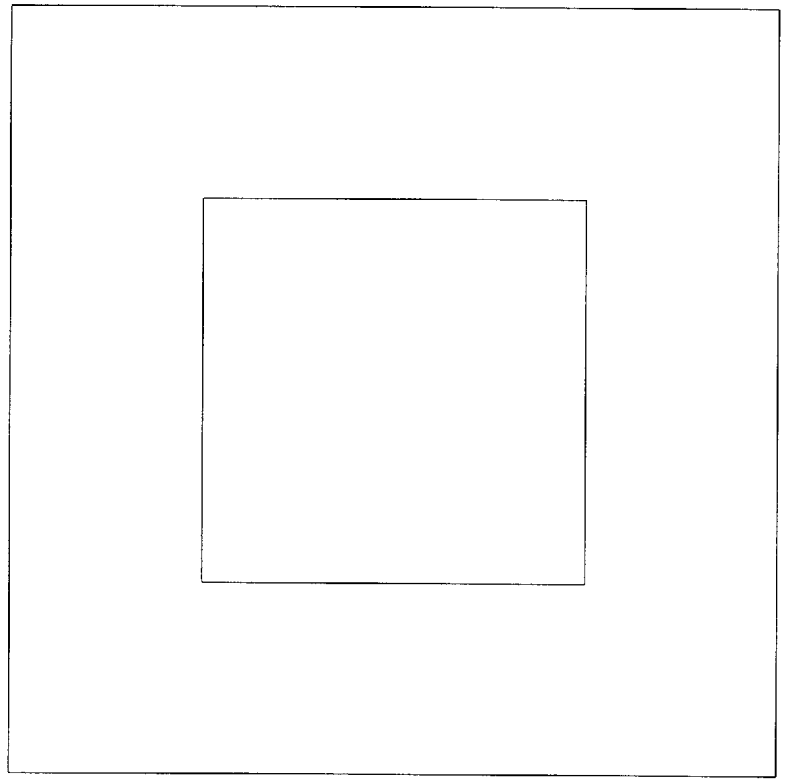

The present invention discloses a method for interacting with a computer system that is particularly appropriate for use with multi-media presentations or other visual presentations where the user desires to have immediate control over certain features of the presentation, but also desires to avoid having to look at a control panel away from the viewing screen, or to view a control display that obscures part of the screen. Examples of applications where such a transparent user interface would have particular advantages include language skills programs, graphical design programs and virtual reality programs such as used by doctors, pilots and designers. What follows is a description of one such application of the invention: controlling a foreign language instructional video with a transparent user interface. It should be appreciated that the method for controlling interaction with computer systems involved in the present invention is not limited to any such particular application.

A foreign language instructional video typically has sound and visual components, and displays scenes of person engaging in conversation in a foreign language in various settings. The facial expressions and gestures of the person, voice inflections, and the settings in which conversations occur all are important aids to learning and understanding the foreign language. The viewer's ability to master a new language with the aid of the instructional video is enhanced if the viewer is not distracted by a control area obscuring part of the screen, or by the need to look away from the screen to manipulate a control panel away from the screen.

The audio and visual content of the instructional video may be conventionally parsed and stored in data files or chunks corresponding to selected word phrases or utterances.

The chunks may also contain a short portion of video before and after the utterance to provide additional visual context for the utterance. The beginning and end points for these chunks may be defined, for example, in SMPTE code, by using the DOS-based tool Foreign Language Authoring Mastery Environment (FLAME) (Rowe, 1985), or by using a tool provided as part of the commercially available Icon-Author software. In this manner, units of speech can be recognized to allow for movement through the video (e.g, rewinding, replaying and forwarding) based on units of speech rather than units of time or data.

The video may also contain reference materials related to the presentation. For example, a database of subtitled text, translated text and/or transliterated text may be made available for synchronized display on the visual presentation at the user's request. In addition, definitions or synonyms for words of the video text may be available for display at the user's request. Numerous other types of information related to the content of the presentation may also be provided.

In one implementation of the present invention, a large-screen monitor defines the viewing space. For example, a screen sufficient in size for viewing by a class may be utilized in the classroom environment. The foreign language instructional video is preferably presented on and occupies the entire viewing space or surface. The video may be provided in a CD ROM or other storage medium and is executed on the CPU of a computer system. A computer-control program governs the presentation of the video, and affords interaction between the user and the video to control the visual and sound elements of the presentation. The control program may be provided with the video on a disk or the like and stored on the computer's hard drive or otherwise in computer memory.

FIG. 1 illustrates some of the functions that may be implemented by the control program. As shown, the program defines (12) one or more interaction functions for the instructional video. Examples of some of the functions that may be provided include: pausing and replaying the current language phrase, playing the next language phrase, replaying the preceding language phrase, displaying foreign language or native language subtitles, playing an oral translation of the current phrase, providing definitions or synonyms for certain terms, providing a transliteration of the current phrase, etc.

The control program also defines (14) one or more control areas relative to the display area of the instructional video and assigns (16) defined interaction functions to the defined control areas. In this regard, the display area preferably covers the entire monitor viewing surface. The number of control areas may be the same as the number of interaction functions. Alternatively, some of the more common interaction functions may have dedicated control areas whereas selection of other control areas may call up an opaque or translucent screen overlay that presents other interaction options relating to the instructional program, or may call up an opaque main menu that offers the choice of accessing other portions of the video program. The graphical layout of the control areas may vary based on the number of interaction functions and certain psychological and visual considerations as discussed in more detail below.

Various processes for defining control areas and assigning functions to the control areas are well known and can be programmed using conventional authoring tools. Such authoring tools include, for example, Authorware marketed by Macromedia. Generally, these tools allow the programmer to select coordinates for a control area, designate a function for the control area and designate a user input for selecting the control area. The designated user input may comprise, for example, receiving a signal in response to a mouse input, touch screen input, voice activation signal, or, in the case of a computer control program that supports kinesthetic tracking, eye targeting signals, hand gesture signals or the like. In the classroom environment, the user input may be provided by way of a portable control device offering mouse-like functionality through remote control, e.g., an infrared remote control allowing cursor activation, movement, and selection input. Authoring programs also allow the programmer to design the visual appearance of the control area including, for example, graphics and text.

In the context of the present invention, such an authoring program can be used to define display coordinates for control areas, and designate corresponding interaction functions. Alternatively, the user may be allowed to select the functions of the transparent control areas, and/or to design the control area layout or select the layout from a menu of layout options. In this manner, control area options and layout can be customized based on user preferences or visual and cognitive capabilities. In order to achieve the desired transparent or invisible characteristic of the control area in accordance with the present invention, the programmer using an authoring tool can simply leave the control area blank or invisible. If the authoring tool provides control area frames, background colors, or other graphics as default parameters, such graphics can be disabled, e.g., by toggling a visible flag of the associated operating system display messages.

The control program then operates (18) the instructional video in conventional fashion to display a visual presentation on the display area of the monitor, and implements (20) the control areas as a transparent overlay viewer interface in the display area. During operation of the instructional video, the control program monitors (22) a user input device to identify a user input. For example, operating-system messages may be monitored to identify a "mouse down" signal. When a user input is thereby identified, the control program determines (24) a control area and interaction function corresponding to the identified input. In this regard, the control program in the illustrated implementation identifies display coordinates associated with the mouse down event or other user input, identifies a control area associated with the user input coordinates, and the user interaction function of the control area. The corresponding interaction function is then implemented (26) by the control program and the program continues to monitor (22) the user input device for further interaction selections.

The transparent user interface of the present invention can be used to provide one or more control areas and associated functions. In the case of a single control area, the coordinates of the control area may correspond to the entire viewing area of the monitor. When the user selects this control area, the computer-control program invokes the system response associated with that area. For example, if the system response is to toggle between still-frame and video play, selecting the transparent control area would result in such toggling, e.g., if video were playing, the active selection would toggle the video to still-frame mode.

FIGS. 2A through 2F show various possible graphical arrangements for a two control area implementation of the present invention. For example, a two control area implementation could be used in the context of a foreign language instructional video to allow users to rewind to a previous utterance or forward to a subsequent utterance. The lines, circle, and square are shown as visible in FIGS. 2A through 2F for the sake of visually illustrating the various ways in which the transparent overlay could be divided to offer two instantaneously accessible interaction options. In actual practice, they would not be visible. As long as the user knows the manner in which the transparent overlay has been divided into two transparent control areas, these areas are intuitively accessible without any visible lines, circles, squares or any other visible cues. For example, if the user knows that the portions of the screen constituting the transparent control areas are the top half of the screen and the bottom half of the screen, accurate selection of either of these areas can be made intuitively, i.e., without support of visual cues such as a horizontal line. However, in cases where it is desirable to orient the user to the divisions of the transparent overlay, the transparent overlay could include hash marks at appropriate points of its perimeter, e.g., at the mid-point of the left and right sides of the overlay in the case where the overlay has been divided into an upper and lower half. Such markings could be entered as minimal graphics instructions in connection with an authoring program such as described above. It is anticipated that such markings would not significantly distract the viewer or interfere with the visual presentation of the instructional video as the corresponding control areas would remain transparent and substantially invisible.

Figure 3A:
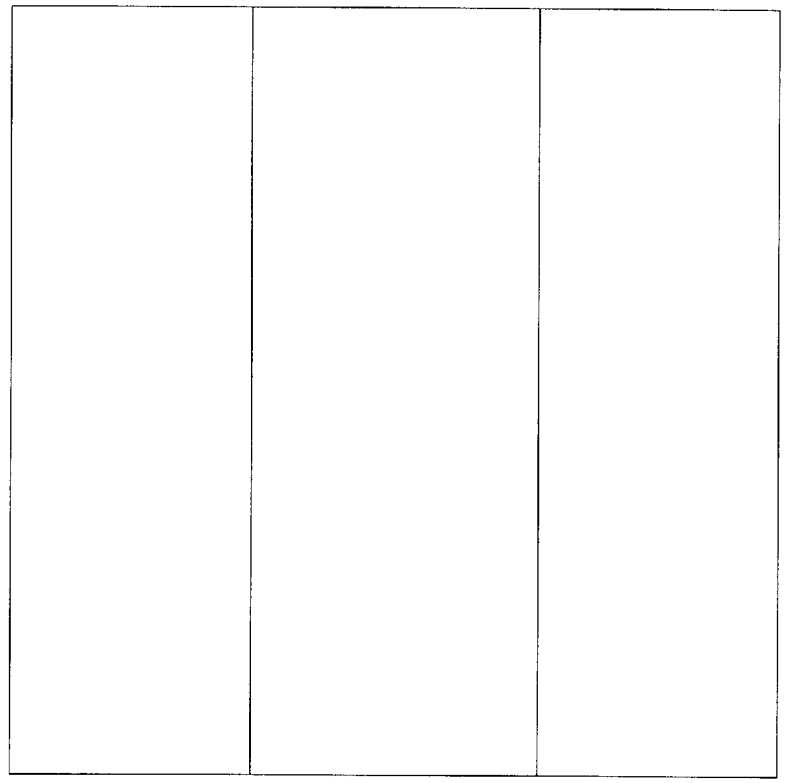
FIGS. 3A and 3B, show graphical arrangements for a three control area implementation of the present invention.
Figure 3B:
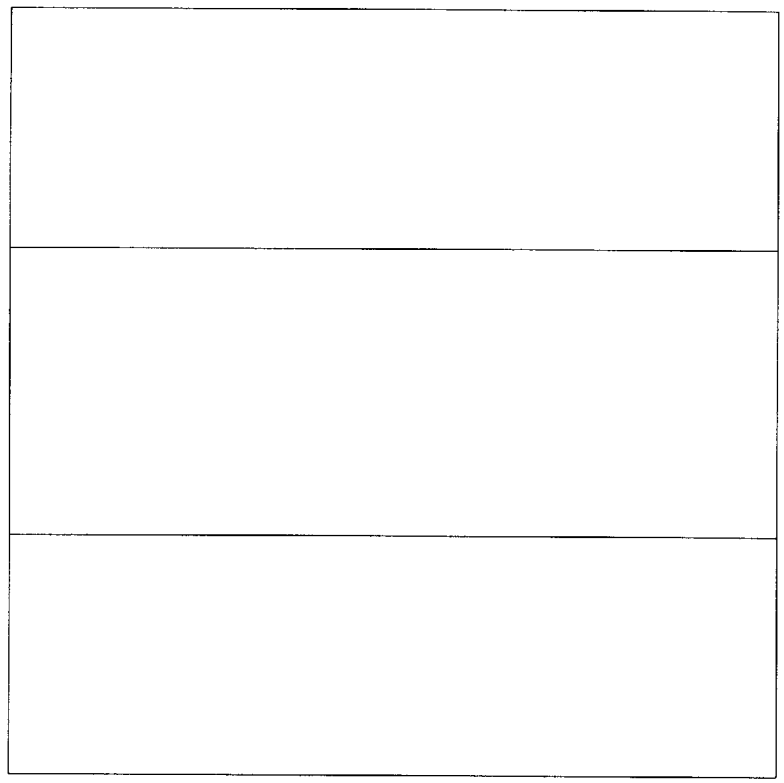

FIGS. 3A and 3B show graphical arrangements for a three control area implementation of the present invention. Although many graphical arrangements for providing three control areas are possible, the illustrated implementations are believed to be particularly advantageous in that certain visual and psychological factors have been found to facilitate user recognition of left, center, right and top, center, bottom separations. The illustrated separations therefore allow a user to instantaneously, accurately, and intuitively select any one of the control areas.

Figure 4:
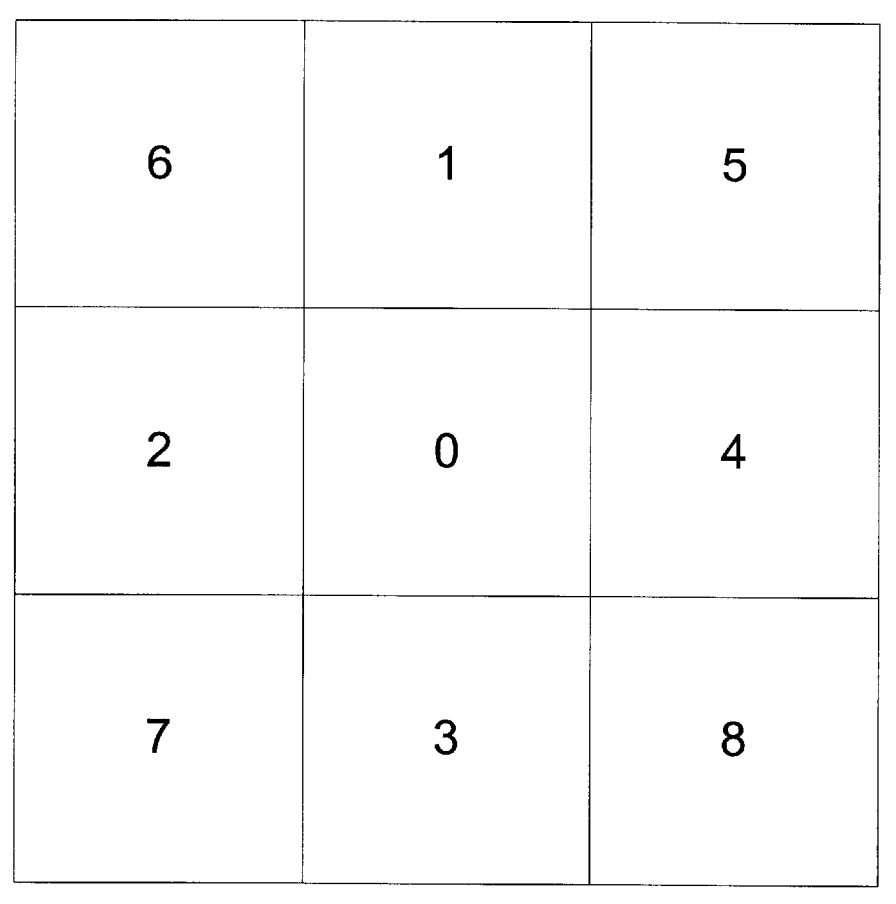

FIG. 4 shows a special case of the transparent graphical user interface system of the present invention. The significance of the manner in which the illustrated sections are enumerated will be understood based on the illustrative case described below. In particular, the illustrated layout is believed to represent an optimal number and arrangement of accurately, intuitively and instantaneously accessible transparent control areas. The illustrated arrangement is based on a number of visual and psychological factors. First, as discussed above, it has been found that users are readily able to distinguish between left, center, right and top, center, bottom divisions in a given viewing area. Moreover, due to the transparent or invisible nature of the control areas of the present invention, it is useful to provide a number of control areas and associated functions that can be learned from instructional materials and remembered by a typical user. In this regard, the nine control areas defined by the illustrated graphical arrangement are generally within Miller's parameters for short-term memory capacity (Miller, G. A., *The Magical Number Seven Plus or Minus Two*: Some Limits on Our Capacity for Processing Information (1956)). In particular, the nine control areas fall within Miller's parameter of seven items plus or minus two (see, also, 63 *Psychological Review*, pp. 81–97). Accordingly, based on cognitive, psychological and visual factors, the illustrated layout of nine control areas is believed to provide about the largest number of transparent control areas that can be readily recalled and targeted by typical viewers. It will be appreciated, however, that adjoining sections of the illustrated grid may be combined to provide a lesser number of control areas if desired.

By way of illustration, the nine part grid implementation of FIG. 4 may be utilized by a foreign language instructor teaching Arabic in the classroom environment. The presentation on a projection screen or large monitor is controlled by the instructor using an infrared mouse or other remote control device. Using such a device the instructor would be able to stop and start the video as needed; call for Arabic script, Romanization (phonetic representation of the Arabic words in the English language alphabet) or translation subtitles to appear as desired; go to a submenu offering other instructional options for the displayed video section; or go to a main menu offering the possibility of accessing other video passages.

The computer control program is prepared with reference to the Arabic instruction video material by dividing the video material into utterance chunks using an appropriate tool such as FLAME as described above. The Arabic script, Romanization, and English language translation associated with each such chunk is then stored for direct control program access using FLAME or a similar tool. An authoring program such as Authorware is then used to define a nine part transparent control grid as described above. Using such a program, the enumerated control areas of FIG. 4 can be assigned the following functionality:

0. Go to beginning of current utterance chunk, play the utterance chunk, and pause.

1. Go to beginning of the next utterance chunk, play the utterance chunk, and pause.
2. Toggle Arabic script subtitle on or off.
3. Go to the beginning of the previous utterance chunk play the utterance chunk, and pause.
4. Toggle Romanization subtitle on or off.
5. Toggle between play and freeze-frame: Selecting this control surface causes the video to freeze-frame if in play mode or play if in freeze-frame mode.
6. Toggle translation subtitle on or off.
7. Go to the control menu for the video passage: This option calls up an opaque screen that hides the video and offers additional instructional options relative to the video passage under study, such as several different sorts of testing, vocabulary study or grammar study.
8. Go to the main menu: This option calls up an opaque screen that hides the video and offers the choice of accessing other video passages.

The present invention thus provides the unobstructed viewing area advantages associated with key-based user interface systems without substantial keyboard manipulation or attendant diversion of focus from the computer viewing area. The invention also provides intuitive, graphically oriented operation as previously associated with GUI systems, but without obstructing the viewing area and potentially distracting viewers. Accordingly, the present invention allows the viewer's attention to remain focused on the application of interest and will benefit users and viewers of various types of application programs including certain immersive applications.

While various implementations of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for allowing interaction with a computer system that includes a viewing space for displaying visual information; said method comprising the steps of:

providing a control program for displaying visual material in at least a first portion of the viewing space;

defining a transparent control area corresponding to at least a part of the first portion of the viewing space, said transparent control area being substantially visually imperceptible at said part;

assigning a predefined user interaction function to said transparent control area, said user interaction function being independent of any visual information displayed at said part of said viewing space of said transparent control area;

receiving a user selection input sufficient to implement said predefined function relative to said transparent control area during a time period where said control area remains transparent; and implementing said assigned user interaction function in response to said received user selection input;

wherein said user selection input is directed to said transparent control area to implement said predefined user interaction function based on a user's mental association of said transparent control area with said corresponding predefined user interaction function free from reference to any object displayed in said viewing space thereby reducing distraction from and enhancing immersion in said displayed visual material of said control program.

2. A method as set forth in claim 1, wherein said step of defining at least one transparent control area comprises identifying viewing space coordinates of said control area and setting a graphical parameter of said control area to provide an invisible graphical presentation of said control area.

3. A method as set forth in claim 1, wherein said step of defining at least one transparent control area comprises providing marginal markings to identify a boundary of said control area, wherein said visual material is displayed within the boundaries of said control area substantially free from visual interference.

4. A method as set forth in claim 1, wherein said transparent control area extends substantially across the entire viewing space.

5. A method as set forth in claim 1, wherein said step of defining at least one transparent control area comprises defining a plurality of control areas located at different portions of said viewing space.

6. A method as set forth in claim 5, wherein said plurality of control areas are associated with a corresponding plurality of user interaction functions.

7. A method as set forth in claim 5, wherein said plurality of control areas are vertically distributed across said viewing area from top to bottom.

8. A method as set forth in claim 5, wherein said plurality of control areas are horizontally distributed across said viewing area from side to side.

9. A method as set forth in claim 5, wherein said plurality of control areas are arranged in a grid pattern.

10. A method as set forth in claim 9, wherein said grid pattern comprises a nine part grid corresponding to nine control areas.

11. A method as set forth in claim 1, wherein said step of assigning a user interaction function comprises selecting a control function to be implemented by said control program and associating said control function with said control area such that said function is implemented by said control program in response to selection of said control area by a user.

12. A method as set forth in claim 1, wherein said step of receiving a user selection input comprises monitoring operating system messages to identify a user input signal and determining a location associated with said input signal in relation to said transparent control area.

13. A method as set forth in claim 1, wherein said step of implementing said assigned user interaction function comprises determining a user input function corresponding to said received user selection input and executing said user input function.

14. A method as set forth in claim 1, wherein said control program is operative for providing foreign language instructional materials and said step of implementing comprises one of changing a play location relative to said instructional materials and providing aids to understanding relative to said instructional materials.

15. A method for allowing interaction with a computer system that includes a viewing space for displaying visual information, said method comprising the steps of:

providing a control program for displaying visual material in said viewing space;

defining a plurality of interaction functions for controlling operation of said control program in response to user inputs;

defining a plurality of transparent control areas relative to said viewing space;

assigning one of said defined plurality of interaction functions to each of said plurality of control areas said interaction functions being independent of any visual information displayed in said viewing space;

operating said control program to display visual material, in portions of said viewing space corresponding to said transparent control areas, that change from time-to-time;

receiving a user input, sufficient to implement one of said interaction functions, relative to said viewing space during a time period where said control areas remain transparent;

identifying a selected control area and a corresponding selected interaction function based on said received user input; and implementing said selected interaction function using said control program.

16. A method as set forth in claim 15, wherein said control program is operative for providing foreign language instructional materials and said step of defining a plurality of interaction functions comprises one of changing a play location relative to said instructional materials and providing aids to understanding relative to said instructional materials.

17. A method as set forth in claim 15, wherein said step of defining a plurality of transparent control areas comprises providing markings to identify a boundary between adjacent control areas, wherein said visual material is displayed within said adjacent control areas substantially free from visual interference.

18. A method as set forth in claim 15, wherein said plurality of control areas are vertically distributed across said area from top to bottom.

19. A method as set forth in claim 15, wherein said plurality of control areas are horizontally distributed across said viewing area from side to side.

20. A method as set forth in claim 15, wherein said plurality of control areas are arranged in a grid pattern.

21. A method as set forth in claim 20, wherein said grid pattern comprises a nine part grid corresponding to nine control areas.

22. A method for providing computer-based interactive foreign language instruction, comprising the steps of:

providing a video product including audiovisual instructional content;

defining a plurality of interaction functions for allowing a user to control a presentation of said audiovisual content;

defining a plurality of transparent control areas relative to a viewing space of a computer system on which the video product operates, wherein said content is displayed in said viewing space substantially without visual interference from said transparent control areas;

assigning one of the plurality of interaction functions to each of the plurality of control areas, said user interaction functions being independent of any visual information displayed in said viewing space;

receiving a user input sufficient to implement of one of said interaction functions associated with one of said control areas during a time period where said control area remains transparent; and implementing said interaction function so as to control said presentation of said audiovisual content;

wherein a user of said video product can control said presentation substantially without distraction from said audiovisual content thereby enhancing learning.

23. A method as set forth in claim 22, wherein said step of defining a plurality of transparent control areas comprises arranging said control areas in a grid pattern.

* * * * *